United States Patent
Kitamura

(10) Patent No.: US 7,391,027 B2
(45) Date of Patent: Jun. 24, 2008

(54) 3D IMAGE RECONSTRUCTING METHOD FOR A POSITRON CT APPARATUS, AND POSITRON CT APPARATUS

(75) Inventor: Keishi Kitamura, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 11/488,020

(22) Filed: Jul. 18, 2006

(65) Prior Publication Data

US 2007/0018108 A1    Jan. 25, 2007

(30) Foreign Application Priority Data

Jul. 25, 2005    (JP)   ............................. 2005-214019

(51) Int. Cl.
    *G01T 1/164*      (2006.01)
(52) U.S. Cl. ............................. 250/363.03; 250/363.04; 250/363.07
(58) Field of Classification Search ............ 250/363.03, 250/363.04, 363.07
    See application file for complete search history.

(56) References Cited

U.S. PATENT DOCUMENTS

| | | | | |
|---|---|---|---|---|
| 5,331,553 A | * | 7/1994 | Muehllehner et al. .. | 250/363.02 |
| 5,990,482 A | * | 11/1999 | Bertelsen et al. ........ | 250/363.04 |
| 6,332,035 B1 | * | 12/2001 | Basu et al. .................. | 382/128 |
| 6,915,004 B2 | * | 7/2005 | Newport et al. ............. | 382/131 |
| 2003/0047687 A1 | * | 3/2003 | Wollenweber ......... | 250/363.03 |
| 2006/0081784 A1 | * | 4/2006 | Ross et al. ............. | 250/363.03 |

FOREIGN PATENT DOCUMENTS

JP      2004-061113      2/2004

* cited by examiner

*Primary Examiner*—David P. Porta
*Assistant Examiner*—Jessica L Eley
(74) *Attorney, Agent, or Firm*—Cheng Law Group PLLC

(57) ABSTRACT

Image quality deterioration due to a drop in resolution or lowering of S/N ratio while reducing the amount of data stored during a 3D data acquisition process, and shortening the time from the start of an examination to the end of imaging. The method and apparatus of this invention perform, in parallel with the 3D data acquisition process, addition of sinograms, reading of subsets of the sinograms having been added, and image reconstruction. Consequently, the amount of data stored is reduced, and the time from the start of an examination to the end of imaging is shortened. At the same time, since 3D iterative reconstruction is not accompanied by conversion from 3D data to 2D data, a drop in resolution due to errors occurring with the conversion from 3D data to 2D data is avoided. The 3D iterative reconstruction can directly incorporate processes such as an attenuation correction process. It is thus possible to avoid also a lowering of S/N ratio resulting from an indirect incorporation of such processes.

6 Claims, 6 Drawing Sheets

*N*-ring scanner

*n* steps

Fig. 8  absorption correcting data
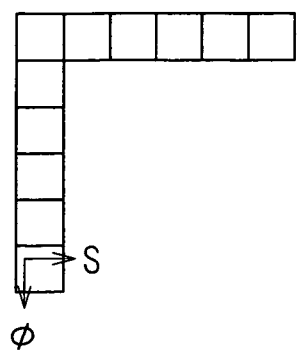
Fig. 9
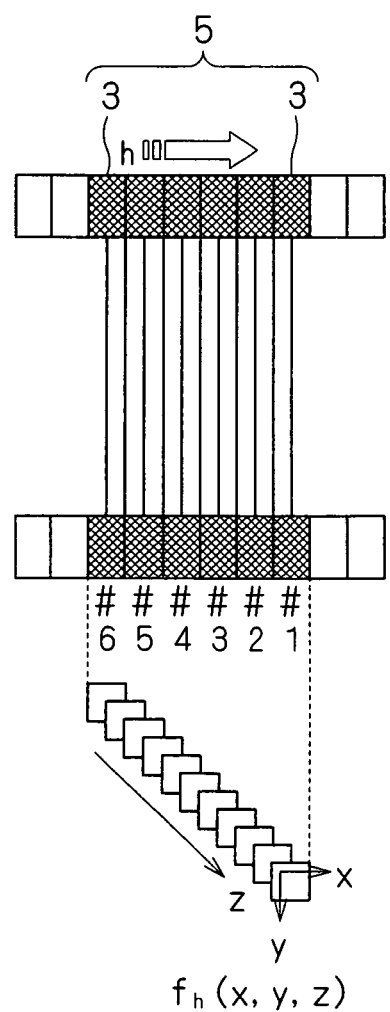

3D IMAGE RECONSTRUCTING METHOD FOR A POSITRON CT APPARATUS, AND POSITRON CT APPARATUS

BACKGROUND OF THE INVENTION (1) Field of the Invention

This invention relates to a 3D image reconstructing method for a positron CT apparatus (hereinafter referred to as "PET apparatus" as appropriate) and to a positron CT apparatus for acquiring sinograms for each combination of ring pairs by detecting coincidence counting data of the ring pairs in each moving position, while moving a multi-ring detector having ring type detectors arranged in an axial direction and a bed having an object under examination placed thereon, relative to each other axially of the multi-ring detector, and performing 3D image reconstruction for RI distribution image reconstruction based on these sinograms. Especially, the invention relates to a technique for improving the quality of RI distribution images.

(2) Description of the Related Art

Conventionally, a PET apparatus that performs an image reconstruction process for RI distribution images based on sinograms acquired through 3D data acquisition moves a multi-ring detector having ring type detectors arranged in an axial direction and a bed having an object under examination placed thereon, axially of the multi-ring detector, for example, relative to each other intermittently at intervals of the ring type detectors. The apparatus detects coincidence counting data of ring pairs in each moving position to collect sinograms for each combination of ring pairs, and performs an image reconstruction process for RI distribution images based on these sinograms.

The conventional PET apparatus usually performs 3D iterative reconstruction for imaging after acquiring all sinograms through 3D data acquisition. However, the sinograms acquired through 3D data acquisition constitute an immense amount of data. Besides, 3D image reconstruction accompanied by 3D projection and back projection processes is started after completion of the sinogram acquisition. The amount of data stored is inevitably huge, and a long time is taken from the start of an examination to the end of imaging.

A different conventional PET apparatus acquires 3D data while adding sinograms to sinograms obtained in an immediately preceding position as sinograms of each ring pair acquired from the same site of the object, and reads successively sinograms having been added, in parallel with the 3D data acquisition process. After the 3D data is converted into 2D data, 2D iterative reconstruction is performed in parallel with the 3D data acquisition process (see Japanese Unexamined Patent Publication No. 2004-61113 (pages 4-8, FIGS. 1-4)).

This prior apparatus, which has been proposed by Inventor herein, performs addition and reading of sinograms and an image reconstruction process in parallel with the 3D data acquisition process. Thus, the apparatus can reduce the amount of data stored and shorten the time taken from the start of an examination to the end of imaging.

However, the above PET apparatus tends to cause image quality deterioration due to a drop in resolution and lowering of S/N ratio. Since this conventional positron apparatus converts 3D data into 2D data, it is difficult to avoid a drop in resolution due to errors occurring with the conversion from 3D data to 2D data. Further, since images are reconstructed from the 2D data, the apparatus cannot directly use 3D data physical models such as detector response, attenuation correction and statistical property in time of image reconstruction. The apparatus has limitations for improvement in the S/N ratio of reconstructed images.

SUMMARY OF THE INVENTION

This invention has been made having regard to the state of the art noted above, and its object is to provide a 3D image reconstructing method for a positron CT apparatus, and provide a positron CT apparatus, capable of avoiding image quality deterioration due to a drop in resolution or lowering of S/N ratio while reducing the amount of data stored in time of a 3D data acquisition process and shortening the time from the start of an examination to the end of imaging.

The above object is fulfilled, according to this invention, by a 3D image reconstructing method for a positron CT apparatus, comprising a 3D data acquiring step for acquiring sinograms for each combination of ring pairs by collecting coincidence counting data of the ring pairs in each moving position, while moving a multi-ring detector having ring type detectors arranged in an axial direction and a bed having an object under examination placed thereon, relative to each other axially of the multi-ring detector; and a 3D image reconstructing step for performing 3D image reconstruction for RI distribution image reconstruction based on the sinograms acquired in the 3D data acquiring step; wherein the 3D data acquiring step is executed to acquire the sinograms while collating sinograms obtained in each position in time of moving the multi-ring detector to sinograms obtained in an immediately preceding position, and adding together sinograms of each ring pair acquired from the same site of the object; and wherein the 3D image reconstructing step is executed to read successively subsets of sinograms having been added, in parallel with the 3D data acquiring step, and to perform 3D iterative reconstruction, each time a subset is read, based on the subset read.

With the method according to this invention, in time of 3D data acquisition, sinograms for RI distribution image reconstruction are acquired for each combination of ring pairs by collecting coincidence counting data of the ring pairs in each moving position, while moving the multi-ring detector and the bed having an object under examination placed thereon, relative to each other axially of the multi-ring detector. In the 3D data acquisition, sinograms with little sensitivity variation in the axial direction are acquired while collating sinograms obtained in each position in time of moving the multi-ring detector to sinograms obtained in an immediately preceding position, and adding together sinograms of each ring pair acquired from the same site of the object. Of the sinograms obtained in each position in time of relative movement of the multi-ring detector and the bed supporting the object under examination, the sinograms obtained in an immediately preceding position overlap those of a ring pair adjacent each ring (that is, these sinograms of the ring pair are acquired from the same site of the object). Sinograms with little sensitivity variation in the axial direction are acquired by adding the overlapping sinograms.

Further, the method according to this invention successively reads only subsets of sinograms having been added, in parallel with the 3D data acquisition. Each time a subset of sinograms is read, 3D iterative reconstruction is performed based on the subset read, to complete a final RI distribution image.

Thus, the method according to this invention performs, in parallel with the 3D data acquisition process, addition of sinograms and reading of subsets, and performs a 3D image reconstruction process each time a subset is read. Consequently, the amount of data stored in time of the data acquisition process is reduced, and the time from the start of an examination to the end of imaging is shortened.

At the same time, the above method performs 3D iterative reconstruction using 3D data and not accompanied by conversion from 3D data to 2D data. This image reconstruction can avoid a drop in resolution due to errors occurring with the conversion from 3D data to 2D data. The 3D iterative reconstruction can directly incorporate processes such as an attenuation correction process. It is thus possible to avoid also a lowering of S/N ratio resulting from an indirect incorporation of such processes.

As noted above, the method according to this invention is capable of avoiding image quality deterioration due to a drop in resolution or lowering of S/N ratio while reducing the amount of data stored in time of a 3D data acquisition process and shortening the time from the start of an examination to the end of imaging.

In another aspect of the invention, a positron CT apparatus comprises a multi-ring detector having ring type detectors arranged in an axial direction; a bed for supporting an object under examination; a moving device for moving the multi-ring detector and the bed relative to each other axially of the multi-ring detector; a 3D data acquiring device for acquiring sinograms for each combination of ring pairs by collecting coincidence counting data of the ring pairs in each relative moving position of the multi-ring detector and the bed, and acquiring data while collating sinograms obtained in each position in time of moving the multi-ring detector to sinograms obtained in an immediately preceding position, and adding together sinograms of each ring pair acquired from the same site of the object; a reading device for successively reading subsets of sinograms having been added, in parallel with the 3D data acquiring process; and a 3D image reconstructing device for performing 3D iterative reconstruction, each time a subset is read by the reading device, based on the subset read.

With the apparatus according to this invention, in time of 3D data acquisition, the 3D data acquiring device acquires sinograms for RI distribution image reconstruction for each combination of ring pairs by collecting coincidence counting data of the ring pairs in each moving position, while the moving device moves the multi-ring detector and the bed having an object under examination placed thereon, relative to each other axially of the multi-ring detector. In the 3D data acquisition, sinograms are acquired while collating sinograms obtained in each position in time of moving the multi-ring detector to sinograms obtained in an immediately preceding position, and adding together sinograms of each ring pair acquired from the same site of the object. Of the sinograms obtained in each position in time of relative movement of the multi-ring detector and the bed supporting the object under examination, the sinograms obtained in an immediately preceding position overlap those of a ring pair adjacent each ring (that is, these sinograms of the ring pair are acquired from the same site of the object). Sinograms with little sensitivity variation in the axial direction are acquired by adding the overlapping sinograms.

Further, in the apparatus according to this invention, the reading device successively reads subsets of sinograms having been added, in parallel with the 3D data acquisition. In addition, in parallel with the 3D data acquisition, the 3D image reconstructing device performs 3D iterative reconstruction, each time a subset of sinograms is read, based on the subset read, to complete a final RI distribution image.

Thus, the apparatus according to this invention executes the 3D image reconstructing method for a positron CT apparatus according to the invention, to reconstruct a 3D image for RI distribution image reconstruction.

Consequently, the positron CT apparatus according to this invention is capable of avoiding image quality deterioration due to a drop in resolution or lowering of S/N ratio while reducing the amount of data stored in time of a 3D data acquisition process and shortening the time from the start of an examination to the end of imaging.

In the method and apparatus according to this invention, it is preferred that the 3D iterative reconstruction is performed as follows.

Based on a statistical model where xj is a pixel value of each reconstruction image, yi is acquired data, and the acquired data yi is assumed to have Poisson distributions, logarithmic likelihood L(x) of the reconstruction image is expressed by the following operational expression:

$$L(x) = \sum_i \{y_i \log\langle a_i, x\rangle - \langle a_i, x\rangle\} + const$$

where $$\langle a_i, x\rangle = \sum_j a_{ij} x_j,$$

$a_{ij}$ is a matrix for matching reconstruction image j and acquired data i, and const is a constant; and an image is reconstructed by determining a maximum likelihood estimation of L(x) in respect of x, a solution being updated according to the following operational expression, that is the acquired data being divided into subsets of sinograms, and a solution of each subset being updated:

$$x_j^{(k,q+1)} = x_j^{(k,q)} + \lambda_k(q) \frac{x_j^{(k,q)}}{C_j} \sum_{i \in S_q} a_{ij} \left( \frac{y_i}{\sum_j a_{ij} x_j^{(k,q)}} - 1 \right)$$

where $$C_j = \max_q \sum_{i \in S_q} a_{ij}$$

$x_j^{(k,q+1)}$ is a pixel value acquired by subset $S_{q+1}$ of the k-th iteration, i.e. a pixel value of the latest update image, $x_j^{(k,q)}$ is a pixel value acquired by subset $S_q$ of the k-th iteration, i.e. a pixel value of the image immediately before the updating, $\lambda_k$ is a relaxation factor, and $$\sum_{i \in S_q}$$

means making acquired data i included in subset $S_q$ an arithmetic object.

In the method and apparatus according to this invention, it is preferred that a number of times of addition difference correction process is performed, before or during the 3D iterative reconstruction, for eliminating non-uniformity of data due to differences in the number of times of sinogram addition in 3D data acquisition. In this way, image quality deterioration due to differences in the number of times of sinogram addition may be avoided.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 8 is a schematic view showing attenuation correcting data corresponding to a subset of sinograms read by the PET apparatus; and FIG. 9 is a schematic view showing a 3D reconstruction image obtained from the PET apparatus.

DESCRIPTION OF THE PREFERRED EMBODIMENTS

A preferred embodiment of this invention will be described in detail hereinafter with reference to the drawings.

Figure 1:
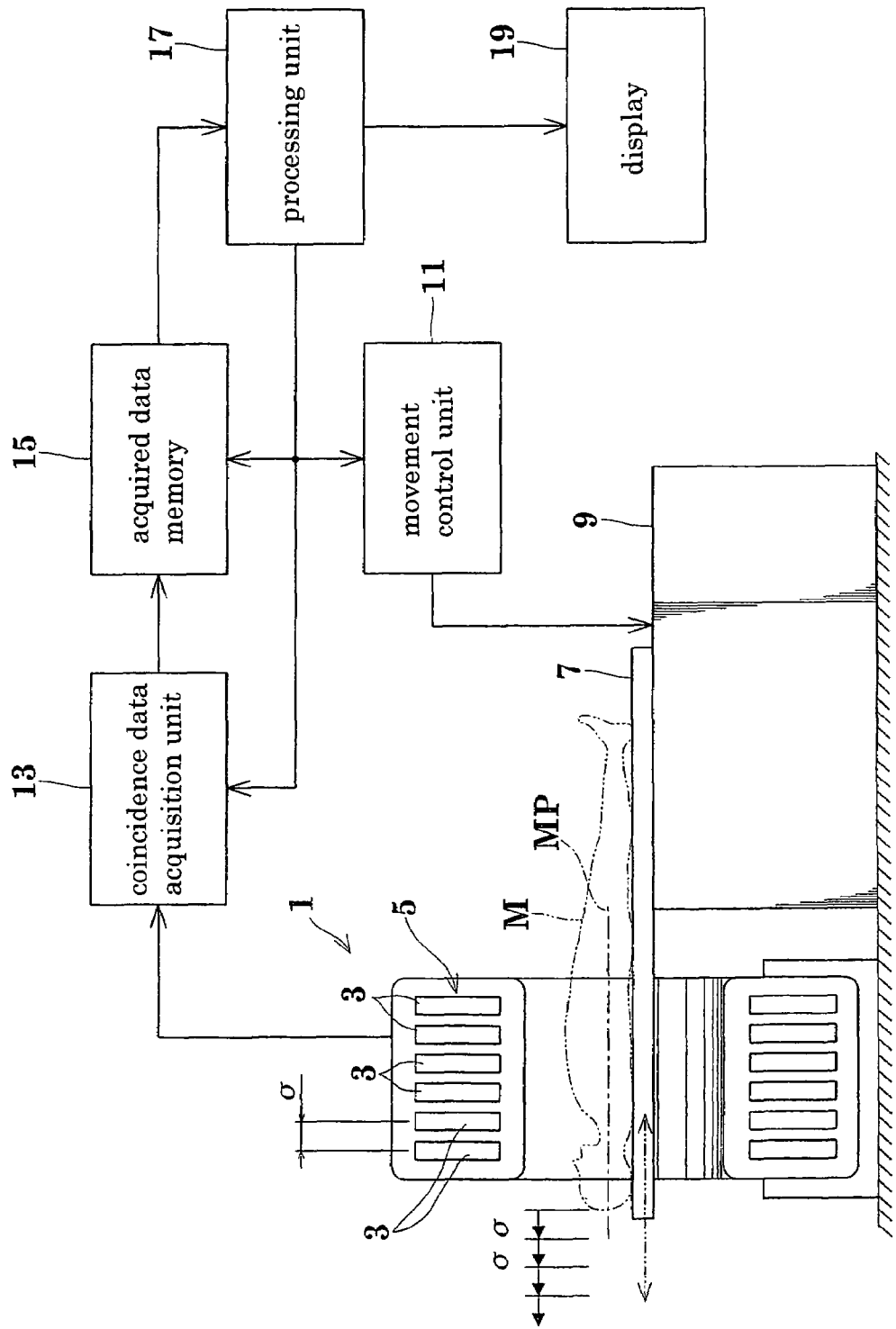
FIG. 1 is a block diagram showing an outline of a PET apparatus according to this invention.
Figure 2:
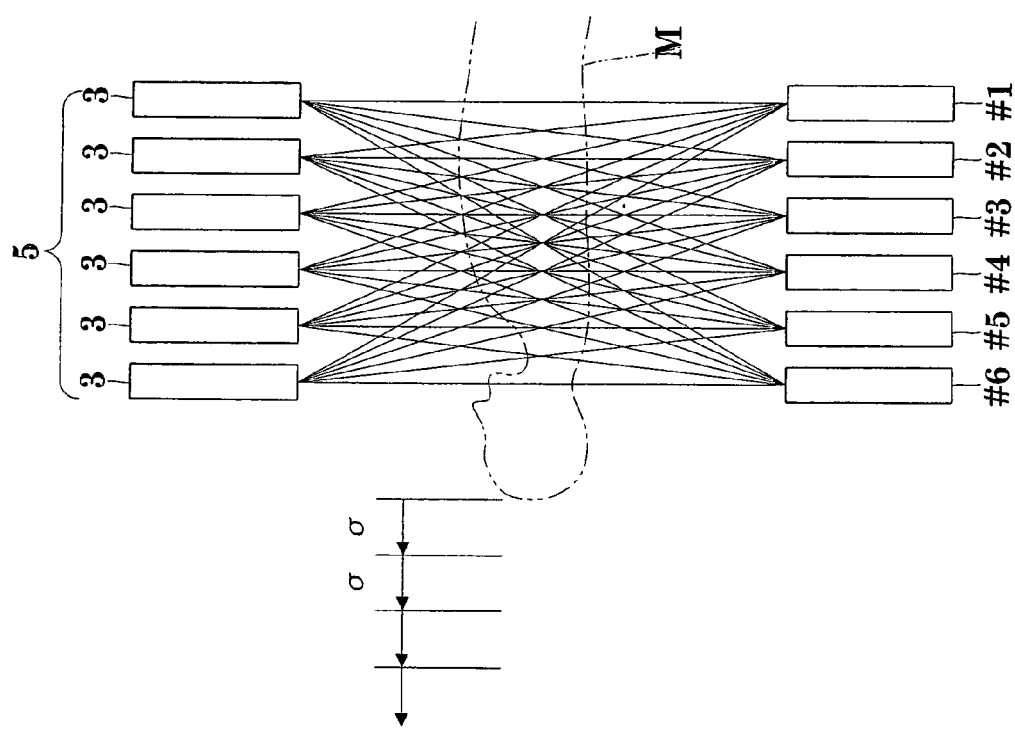
FIG. 2 is a schematic view showing a positional relationship between movement of an object under examination and a multi-ring detector in the PET apparatus.

A method and an apparatus according to this invention will be described with reference to the drawings. FIG. 1 is a block diagram showing an outline of a PET apparatus according to this invention. FIG. 2 is a schematic view showing a positional relationship between movement of an object under examination and a multi-ring detector in the PET apparatus.

The PET apparatus according to the invention includes a gantry 1 having a center opening and ring detectors 3 in the form of radiation detectors arranged in ring form. A multi-ring detector 5 has, for example, ring type radiation detectors 3 forming six rings (#1 to #6) arranged along the axis of the opening of the gantry 1.

Arranged in front of the gantry 1 are a bed 7 movable back and forth (in and out) relative to the opening of the gantry 1, and a bed moving device 9 for moving the bed 7 back and forth in directions indicated by a two-dot chain line arrow in FIG. 1. The movement of the bed 7 is controlled by a movement control unit 11 to follow a body axis MP aligned to the center of the opening of the gantry 1, so that the bed 7 may be moved into and out of the opening of the gantry 1.

As noted above, the multi-ring detector 5 has ring type detectors forming the first to sixth rings #1 to #6. Coincidence counting is performed among the radiation detectors arranged circumferentially of each of the first to sixth rings #1 to #6, and among the radiation detectors forming the first to sixth rings #1 to #6. This coincidence counting is carried out by a coincidence data acquisition unit 13.

Specifically, as shown in lines linking the ring type detectors 3 in FIG. 2, the coincidence counting is performed in varied combinations of ring pairs, such as among the detectors forming the first ring #1, among the detectors forming the first ring #1 and second ring #2, among the detectors forming the first ring #1 and third ring #3, among the detectors forming the first ring #1 and fourth ring #4, among the detectors forming the first ring #1 and fifth ring #5, and among the detectors forming the first ring #1 and sixth ring #6. Since the coincidence counting is performed also among the ring type detectors 3 forming different rings, the coincidence counting lines exist for each combination of ring pairs.

Figure 3A:
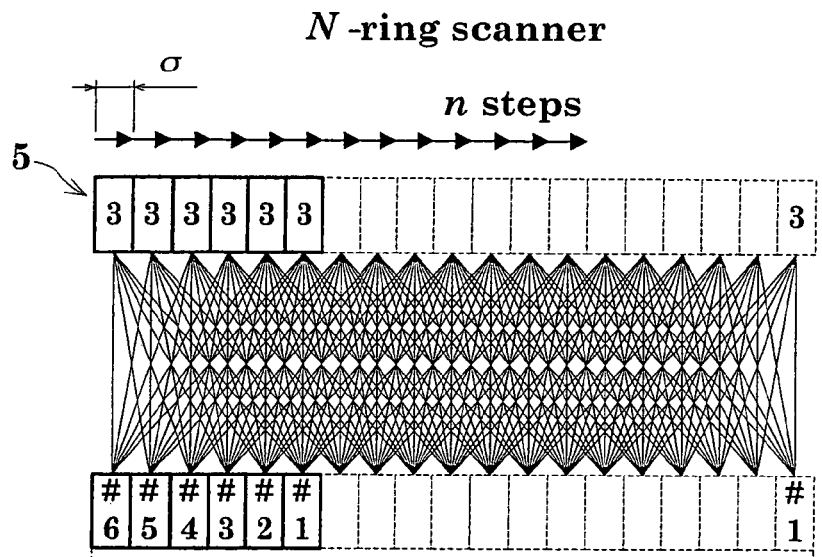
FIGS. 3A through 3C are schematic views for illustrating addition of sinograms.
Figure 3B:
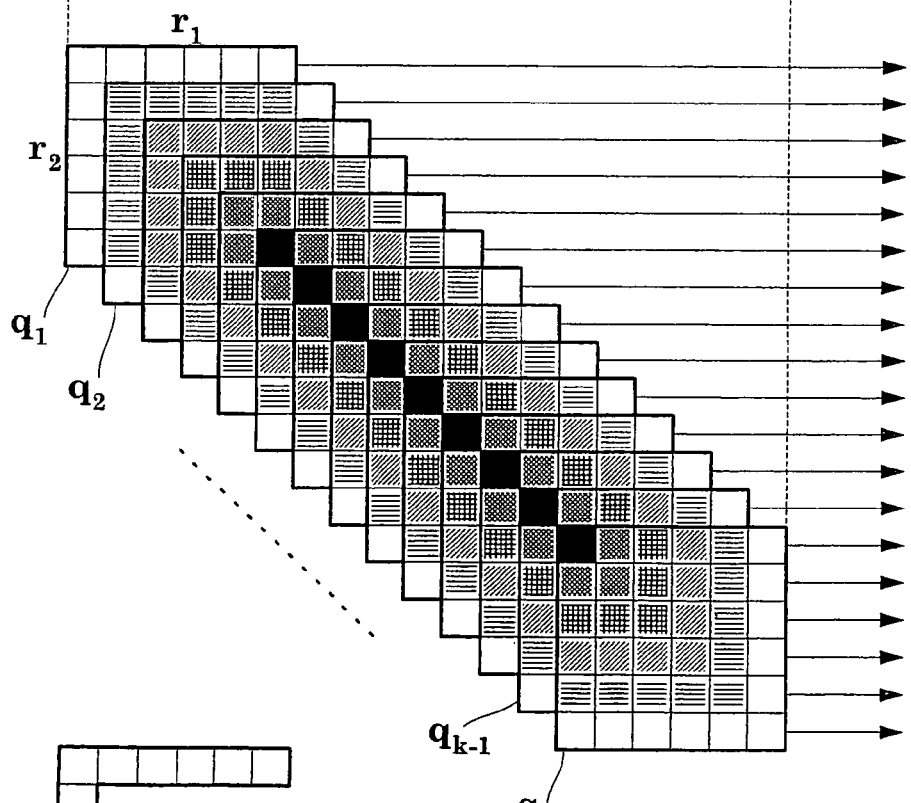
Figure 3C:
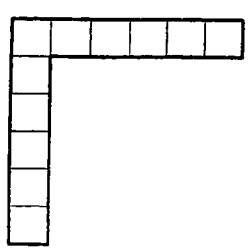

The embodiment will be described further with reference also to FIGS. 3A through 3C. FIGS. 3A through 3C are schematic views illustrating addition of sinograms carried out while shifting sinogram matrices. FIG. 3A shows a relative movement when continuously acquiring data. FIG. 3B shows addition of oblique sinograms obtained in varied moving positions while shifting matrices acquired. FIG. 3C is a schematic view showing part (subset) of one of matrices successively read at this time.

It is assumed here that, as shown in FIG. 3A, for example, data is acquired in each moving position while the bed 7 is moved intermittently at detector intervals σ relative to the multi-ring type detector 5. In this case, the coincidence data in each position of the bed 7 collected by the coincidence data acquisition unit 13 is expressed as a matrix of r1×r2 in FIG. 3B. Each of the small squares forming the matrices represents a sinogram of each ring pair. The sinogram is expressed by a distance from a medial axis (radius vector s) and an angle in the circumferential direction (azimuth φ) of a line (coincidence line) linking two detectors having detected radiation simultaneously. Data obtained in each moving position is transmitted as sinograms to and stored in an acquired data memory 15. The sinograms transmitted in this way are collated with sinograms acquired in an immediately preceding position, and sinograms of each ring pair acquired from the same site of the patient M are added together. Thus, the coincidence data acquisition unit 13 and acquired data memory 15 constitute the 3D data acquiring device in the apparatus according to the invention.

Next, details of a collaboration process by the above coincidence data acquisition unit 13, acquired data memory 15 and a processing unit 17 will particularly be described, using accepted operational expressions (transformations) also.

With the PET apparatus having the ring type detectors 3 forming N rings, $N^2$ sinograms qk (s, φ, r, Δr) are obtained in each position k of the bed 7. Here, s and φ are radius vector directions and azimuths of the sinograms, $r=r_1+r_2$ is an axial slice index, and $\Delta r=r_1-r_2$ is a ring difference. $r_1$ and $r_2$ are the ring numbers to which the rings having undergone the coincidence counting belongs. To facilitate understanding, it is assumed hereinafter that data is sampled in continuous acquisition at the same intervals as intervals (width φ) between the ring type detectors 3. In this case, a data space as shown in FIG. 3B is obtained. As seen from FIG. 3B, adjacent sinograms are acquired in overlaps, and therefore a new set of sinograms $P_h$ (s, φ, Δr) is formed while adding the sinograms in real time.

Here, h=0, ..., N+n−2 is a virtual ring index obtained when continuous acquisition is carried out in n steps. At this time, each sinogram is expressed by the following operational expression (1):

$$P_h(s, \phi, \Delta r) = \frac{1}{K} \sum_{k=k_{min}}^{k_{max}} q_k(s, \phi, 2h - 2k + |\Delta r|, \Delta r) \quad (1)$$

where $\Delta r=(r_1-r_2)=0, \pm 1, \pm 2, \ldots, \pm \Delta r_{max}$, and $k_{min}$=max $\{0, h-(N-1-|\Delta r|)\}$. $k_{max}$=min $\{h, n-1\}$, $K=k_{max}-k_{min}+1$ and $\Delta r_{max}$ is a maximum number of ring differences used for reconstruction.

A new set of sinograms ph (s, φ, Δr) is normalized by the number of times K of addition. The number of times K of addition is in inverse proportion to ring difference delta r, excluding (N−1) data sets at opposite ends (h<N−1 or h>N−1). In FIG. 3B, small squares represent sinograms qk, with shading applied in line variations according to the number of times K of data addition. A subset of sinograms with an addition completed for each step is a division group in the form of letter L turned sideways as shown in FIG. 3C.

With the PET apparatus in this embodiment, only a subset of sinograms is read whenever addition is completed, in parallel with a 3D data acquisition process. That is, a subset of sinograms for which the addition is completed is read in each step. The apparatus carries out, before a 3D image reconstruction process, a number of times of addition difference correction process for eliminating, from the subsets read, non-uniformity of data due to differences in the number of times K of sinogram addition. In this embodiment, multiplication factor (1/K) in the operational expression (1) corresponds to the number of times of addition difference correction process.

Figure 4:
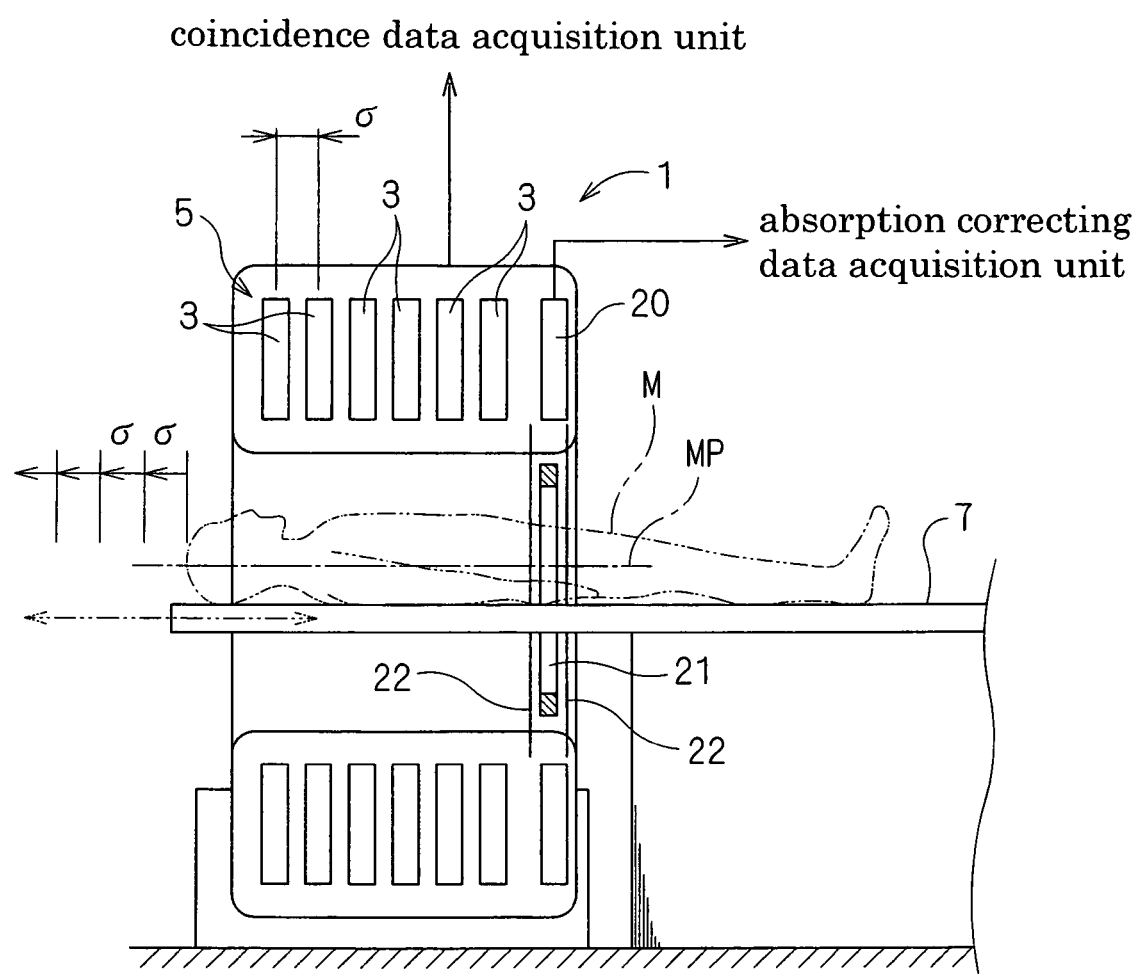
FIG. 4 is a schematic view showing a construction of an attenuation correcting data acquisition system in the PET apparatus.

On the other hand, in the case of the PET apparatus in this embodiment, as shown in FIG. 4, the multi-ring detector 5 includes a ring type radiation detector 20 for acquiring attenuation correcting data (transmission data) and a ring type external radiation source 21 arranged adjacent an open end thereof. With the ring type radiation detector 20 and ring type external radiation source 21, attenuation correcting data can be acquired prior to the 3D data acquisition by the multi-ring detector 5, from the same site of the patient M. Attenuation correcting data acquired by an attenuation correcting data acquisition unit (not shown) based on detection signals outputted from the ring type radiation detector 20 is stored in a form corresponding to the subsets of sinograms in an attenuation correcting data memory (not shown).

A slice-septa 22 is provided for preventing radiation from the ring type external radiation source 21 from leaking toward the multi-ring detector 5.

The ring type external radiation source 21 may be replaced by a point external radiation source revolvable circumferentially.

It is not essential for the PET apparatus to have the function for acquiring attenuation correcting data. The PET apparatus may use attenuation correcting data received from a separate apparatus such as an X-ray CT apparatus.

On the other hand, in parallel with the 3D data acquisition process, the processing unit 17 performs a 3D image reconstruction for RI distribution image reconstruction based on the sinograms acquired through 3D data acquisition. Specifically, each time a subset of sinograms is read in parallel with the three-dimensional data acquisition process, 3D iterative reconstruction is carried out based on the subset read. Thus, the processing unit 17 corresponds to the 3D image reconstructing device for performing 3D image reconstruction for RI distribution image reconstruction.

Figure 5:
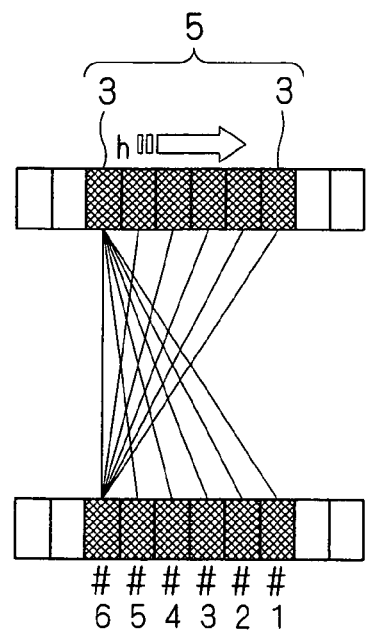
FIG. 5 is a schematic view showing ring pairs corresponding to sinograms forming a subset for a given moving position of the object under examination in the PET apparatus.
Figure 6:
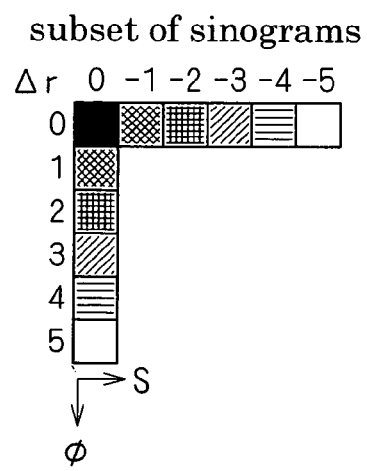
FIG. 6 is a schematic view showing a subset of sinograms read in each step of the PET apparatus.

Reference is made also to FIGS. 5 and 6. FIG. 5 is a schematic view showing ring pairs corresponding to sinograms forming a subset for a given moving position. FIG. 6 is a schematic view showing a subset of sinograms read in each step. As shown in FIG. 6, a sinogram subset includes a plurality of sinograms belonging to the region of letter L turned sideways, corresponding to an upper side portion and a left-hand side portion of an N2 sinogram matrix. That is, the subset consists of a plurality of sinograms corresponding to the ring pairs linked by lines in FIG. 5.

Figure 7:
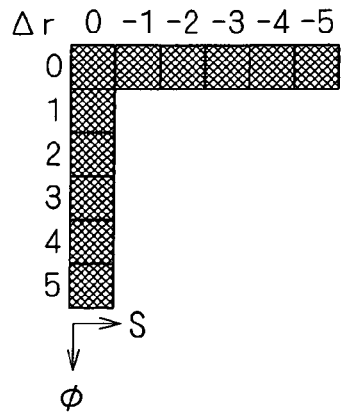
FIG. 7 is a schematic view showing a state where non-uniformity of data due to differences in the number of times of addition in a subset of sinograms read by the PET apparatus.

The subset intrinsically has non-uniformity among the data due to differences in the number of times K of sinogram addition as shown in the shading of line variations in FIG. 6. However, the data non-uniformity is eliminated, as shown in FIG. 7, by the number of times difference correction process for eliminating the non-uniformity among the data due to differences in the number of times K of sinogram addition. In the case of the PET apparatus in this embodiment, therefore, image quality deterioration due to differences in the number of times K of sinogram addition is avoided since the 3D iterative reconstruction is carried out after eliminating the non-uniformity among the data due to differences in the number of times K of sinogram addition.

The 3D iterative reconstruction carried out by the processing unit 17 is a process called 3D (three-dimensional)-DRAMA (Dynamic Row Action Maximum likelihood Algorithm) method performed according to the operational expressions set out hereinafter (see, for example, Atsusi Fukano and Hiroyuki Kudo, Conference Record of 2004 IEEE Nuclear Science Symposium and Medical Imaging Conference, Paper No. M4-1).

Based on a statistical model where $x_j$ is a pixel value of each emission image (reconstruction image) for forming a 3D reconstruction image $f_h$ (x, y, z), $y_i$ is acquired data (projection data), and the acquired data $y_i$ is assumed to have Poisson distributions, logarithmic likelihood L(x) of the reconstruction image is expressed by the following operational expression (2):

$$L(x) = \sum_i \{y_i \log\langle a_i, x \rangle - \langle a_i, x \rangle\} + const \quad (2)$$

where $$\langle a_i, x \rangle = \sum_j a_{ij} x_j,$$

$a_{ij}$ is a matrix for matching reconstruction image j and acquired data i, and const is a constant.

An image can be reconstructed by determining a maximum likelihood estimation of L(x) in respect of x. The solution by the 3D-DRAMA method is updated according to the following operational expression (3):

$$x_j^{(k,q+1)} = x_j^{(k,q)} + \lambda_k(q) \frac{x_j^{(k,q)}}{C_j} \sum_{i \in S_q} a_{ij} \left( \frac{y_i}{\sum_j a_{ij} x_j^{(k,q)}} - 1 \right) \quad (3)$$

where $$C_j = \max_q \sum_{i \in S_q} a_{ij}$$

$x_j^{(k,q+1)}$ is a pixel value acquired by subset $S_{q+1}$ of the k-th iteration, i.e. a pixel value of the latest update image, $x_j^{(k,q)}$ is a pixel value acquired by subset $S_q$ of the k-th iteration, i.e. a pixel value of the image immediately before the updating, $\lambda_k$ is a relaxation factor, and $$\sum_{i \in S_q}$$

means making acquired data i included in subset $S_q$ an arithmetic object.

That is, the operational expression (3) divides the acquired data into subsets of sinograms, and attains an improvement in the speed of operation by updating a solution of each subset.

With the 3D-DRAMA method, as shown in FIG. 8, the attenuation correcting data is acquired and stored in the form of a matrix corresponding to a subset of sinograms, and is one of the determination factors of matrix $a_{ij}$. This data is reflected on the value of matrix $a_{ij}$ which matches reconstruction images j and acquired data i. As a result, the process such as the attenuation correction process for suppressing lowering of S/N ratio is incorporated directly into the 3D image reconstruction process. It is also possible to incorporate a detector response correction, a statistical fluctuation correction and the like that suppress lowering of S/N ratio, as reflected on the value of matrix $a_{ij}$, directly into the 3D image reconstruction process. Further, the number of times K of addition may be reflected on matrix $a_{ij}$, to correct differences in the number of times K of sinogram addition during the reconstruction process.

In the 3D image reconstruction process of the apparatus in this embodiment, an RI distribution image is completed by acquiring a 3D reconstruction image $f_h(x, y, z)$ of virtual ring index at each moving position of the bed 7 (each step) as shown in FIG. 9. Between adjacent steps, the reconstructed images overlap. In the 3D image reconstruction process, a preceding one of the overlapping images is used as an initial image of the next overlapping image.

By updating and displaying images with progress of the reconstruction process, the images may be continuously monitored on a display 19 in real time during the examination.

With the 3D-DRAMA method used by the apparatus in this embodiment, the reconstruction process may be carried out after further dividing data of each subset of sinograms by azimuth $\phi$ of the sinograms, or further dividing data of each subset of sinograms by both azimuth $\phi$ and radius vector direction s of the sinograms.

In this embodiment, the apparatus, in parallel with the 3D data acquisition process, adds sinograms, reads subsets, and performs the image reconstruction process for RI distribution image reconstruction based on the subsets read. Consequently, the apparatus can reduce the amount of data stored during the 3D data acquisition process, and shorten the time from the start of an examination to the end of imaging.

In this embodiment, the apparatus employs the 3D interative reconstruction for performing image reconstruction using 3D data, which is not accompanied by conversion from 3D data to 2D data. It is thus possible to avoid a drop in resolution due to errors occurring with the conversion from 3D data to 2D data. The 3D interative reconstruction can directly incorporate the processes such as the attenuation correction process for suppressing lowering of S/N ratio. This is more effective for avoiding lowering of S/N ratio than a technique of indirectly incorporating the processes for suppressing lowering of S/N ratio.

According to the method and apparatus in this embodiment, therefore, image quality deterioration due to a drop in resolution or lowering of S/N ratio is avoided while reducing the amount of data stored during the 3D data acquisition process, and shortening the time from the start of an examination to the end of imaging.

This invention not limited to the foregoing embodiment, but may be modified as follows:

(1) In the foregoing embodiment, the 3D data acquisition is performed according to the operational expression (1). The 3D data acquisition in this invention may be performed according to an expression other than the operational expression (1).

(2) In the foregoing embodiment, the 3D interative reconstruction is performed according to the operational expressions (2) and (3). The 3D interative reconstruction in this invention may be performed according to expressions other than the operational expressions (2) and (3).

For example, the following three expressions are cited as modifications of the expression (3).

$$x_j^{(k,q+1)} = \frac{x_j^{(k,q)}}{C_{ij}} \sum_{i \in S_q} a_{ij} \frac{y_i}{\sum_j a_{ij} x_j^{(k,q)}}, \text{ where} \quad (3)'$$

$$C_{ij} = \sum_{i \in S_q} a_{ij}$$

$$x_j^{(k,q+1)} = x_j^{(k,q)} + \frac{x_j^{(k,q)}}{C_j} \sum_{i \in S_q} a_{ij} \left( \frac{y_i}{\sum_j a_{ij} x_j^{(k,q)}} - 1 \right), \text{ where} \quad (3)''$$

$$C_j = \max_q \sum_{i \in S_q} a_{ij}$$

$$x_j^{(k,q+1)} = x_j^{(k,q)} + \lambda_k \frac{x_j^{(k,q)}}{C_j} \sum_{i \in S_q} a_{ij} \left( \frac{y_i}{\sum_j a_{ij} x_j^{(k,q)}} - 1 \right), \text{ where} \quad (3)'''$$

$$C_j = \max_q \sum_{i \in S_q} a_{ij}$$

Considers maximization of $\Phi(x) = L(x) - \beta R(x)$ instead of maximizing $L(x)$ in expression (2), images may be updated by the following modified expression:

$$x_j^{k+1} = \frac{x_j^{MLEM<k+1>}}{1 + \beta \frac{\partial}{\partial \lambda_j} R(\lambda)|_{\lambda = \lambda^k}}$$

where $R(x)$ is a potential function including a priori information of the images, $\beta$ is a regularization parameter for adjusting its degree, and $x_j^{MLEM<k+1>}$ is a pixel value derived from expression (3), (3)', (3)" or (3)'".

This invention may be embodied in other specific forms without departing from the spirit or essential attributes thereof and, accordingly, reference should be made to the appended claims, rather than to the foregoing specification, as indicating the scope of the invention.

What is claimed is:

1. A 3D image reconstructing method for a positron CT apparatus, comprising:
    a 3D data acquiring step for acquiring sinograms for each combination of ring pairs by collecting coincidence counting data of the ring pairs in each moving position, while moving a multi-ring detector having ring type detectors arranged in an axial direction and a bed having an object under examination placed thereon, relative to each other axially of the multi-ring detector; and
    a 3D image reconstructing step for performing 3D image reconstruction for RI distribution image reconstruction based on said sinograms acquired in said 3D data acquiring step;
    wherein said 3D data acquiring step is executed to acquire the sinograms while collating sinograms obtained in each position in time of moving the multi-ring detector to sinograms obtained in an immediately preceding position, and adding together sinograms of each ring pair acquired from the same site of the object; and
    wherein said 3D image reconstructing step is executed to read successively subsets of sinograms having been added, in parallel with said 3D data acquiring step, and to perform 3D iterative reconstruction, each time a subset is read, based on the subset read.

2. A 3D image reconstructing method for a positron CT apparatus as defined in claim 1, wherein:
    in performing the 3D iterative reconstruction,
    based on a statistical model where xj is a pixel value of each reconstruction image, yi is acquired data, and the acquired data yi is assumed to have Poisson distributions, logarithmic likelihood L(x) of the reconstruction image is expressed by the following operational expression:

$$L(x) = \sum_i \{y_i \log\langle a_i, x\rangle - \langle a_i, x\rangle\} + const$$

where $$\langle a_i, x\rangle = \sum_j a_{ij} x_j,$$

$a_{ij}$ is a matrix for matching reconstruction image j and acquired data i, and const is a constant; and
    an image is reconstructed by determining a maximum likelihood estimation of L(x) in respect of x, a solution being updated according to the following operational expression, that is the acquired data being divided into subsets of sinograms, and a solution of each subset being updated:

$$x_j^{(k,q+1)} = x_j^{(k,q)} + \lambda_k(q) \frac{x_j^{(k,q)}}{C_j} \sum_{i \in S_q} a_{ij} \left( \frac{y_i}{\sum_j a_{ij} x_j^{(k,q)}} - 1 \right)$$

where $$C_j = \max_q \sum_{i \in S_q} a_{ij}$$

$x_j^{(k, q+1)}$ is a pixel value acquired by subset $S_q$ of the k-th iteration, i.e. a pixel value of the latest update image,
$x_j^{(k, q)}$ is a pixel value acquired by subset $S_q$ of the k-th iteration, i.e. a pixel value of the image immediately before the updating,
$\lambda_k$ is a relaxation factor, and $$\sum_{i \in S_q}$$

means making acquired data i included in subset $S_q$ an arithmetic object.

3. A 3D image reconstructing method for a positron CT apparatus as defined in claim 1, wherein a number of times of addition difference correction process is performed, before or during the 3D iterative reconstruction, for eliminating non-uniformity of data due to differences in the number of times of sinogram addition in 3D data acquisition.

4. A positron CT apparatus comprising:
    a multi-ring detector having ring type detectors arranged in an axial direction;
    a bed for supporting an object under examination;
    a moving device for moving said multi-ring detector and said bed relative to each other axially of said multi-ring detector,
    a 3D data acquiring device for acquiring sinograms for each combination of ring pairs by collecting coincidence counting data of the ring pairs in each relative moving position of said multi-ring detector and said bed, and acquiring data while collating sinograms obtained in each position in time of moving the multi-ring detector to sinograms obtained in an immediately preceding position, and adding together sinograms of each ring pair acquired from the same site of the object;
    a reading device for successively reading subsets of sinograms having been added, in parallel with said 3D data acquiring step; and
    a 3D image reconstructing device for performing 3D iterative reconstruction, each time a subset is read by said reading device, based on the subset read.

5. A positron CT apparatus as defined in claim 4, wherein said 3D image reconstructing device performs the 3D iterative reconstruction such that,
    based on a statistical model where xj is a pixel value of each reconstruction image, yi is acquired data, and the acquired data yi is assumed to have Poisson distributions, logarithmic likelihood L(x) of the reconstruction image is expressed by the following operational expression:

$$L(x) = \sum_i \{y_i \log\langle a_i, x\rangle - \langle a_i, x\rangle\} + const$$

where $$\langle a_i, x \rangle = \sum_j a_{ij} x_j,$$

is a matrix for matching reconstruction image j and acquired data i, and const is a constant; and an image is reconstructed by determining a maximum likelihood estimation of L(x) in respect of x, a solution being updated according to the following operational expression, that is the acquired data being divided into subsets of sinograms, and a solution of each subset being updated:

$$x_j^{(k,q+1)} = x_j^{(k,q)} + \lambda_k(q) \frac{x_j^{(k,q)}}{C_j} \sum_{i \in S_q} a_{ij} \left( \frac{y_i}{\sum_j a_{ij} x_j^{(k,q)}} - 1 \right)$$

where $$C_j = \max_q \sum_{i \in S_q} a_{ij}$$

$x_j^{(k,\, q+1)}$ is a pixel value acquired by subset $S_{q+1}$ of the k-th iteration, i.e. a pixel value of the latest update image, $x_j^{(k,\, q)}$ is a pixel value acquired by subset $S_q$ of the k-th iteration, i.e. a pixel value of the image immediately before the updating, $\lambda_k$ is a relaxation factor, and $$\sum_{i \in S_q}$$

means making acquired data i included in subset $S_q$ an arithmetic object.

6. A positron CT apparatus as defined in claim 4, wherein said 3D image reconstructing device performs a number of times of addition difference correction process, before or during the 3D iterative reconstruction, for eliminating non-uniformity of data due to differences in the number of times of sinogram addition in 3D data acquisition.

\* \* \* \* \*